(12) United States Patent
Cramer

(10) Patent No.: US 8,095,582 B2
(45) Date of Patent: Jan. 10, 2012

(54) DYNAMIC SEARCH ENGINE RESULTS EMPLOYING USER BEHAVIOR

(75) Inventor: Mark Cramer, San Francisco, CA (US)

(73) Assignee: Surf Canyon Incorporated, San Francisco, CA (US)

( * ) Notice: Subject to any disclaimer, the term of this patent is extended or adjusted under 35 U.S.C. 154(b) by 0 days.

(21) Appl. No.: 12/652,004

(22) Filed: Jan. 4, 2010

(65) Prior Publication Data

US 2010/0106703 A1    Apr. 29, 2010

Related U.S. Application Data

(63) Continuation of application No. 11/510,524, filed on Aug. 25, 2006, now abandoned.

(60) Provisional application No. 60/796,624, filed on May 2, 2006.

(51) Int. Cl.
*G06F 7/00* (2006.01)
*G06F 17/30* (2006.01)

(52) U.S. Cl. ............. 707/999.003; 707/705; 707/706; 707/707; 707/708; 707/723; 707/736; 707/737

(58) Field of Classification Search .............. None
See application file for complete search history.

(56) References Cited

U.S. PATENT DOCUMENTS

| | | | | |
|---|---|---|---|---|
| 5,806,077 A * | 9/1998 | Wecker | .......... | 715/236 |
| 5,946,678 A * | 8/1999 | Aalbersberg | .......... | 1/1 |
| 6,134,532 A * | 10/2000 | Lazarus et al. | .......... | 705/14.25 |
| 6,981,040 B1 * | 12/2005 | Konig et al. | .......... | 709/224 |
| 2002/0107776 A1 * | 8/2002 | Bove et al. | .......... | 705/37 |
| 2004/0111678 A1 * | 6/2004 | Hara et al. | .......... | 715/526 |
| 2005/0071328 A1 * | 3/2005 | Lawrence | .......... | 707/3 |
| 2006/0064411 A1 * | 3/2006 | Gross et al. | .......... | 707/3 |

* cited by examiner

*Primary Examiner* — Tony Mahmoudi
*Assistant Examiner* — Yu Zhao
(74) *Attorney, Agent, or Firm* — Kilpatrick Townsend & Stockton LLP

(57) ABSTRACT

A method and apparatus for dynamically modifying search results "on the fly" based on the behavior of the user currently conducting a search. In one embodiment, data regarding user behavior is gathered from virtually any activity, including clicks on links, dwell times, downloads, transactions and cursor movements. Subordinate keywords are generated to reflect the intent of the user as inferred from the user's behavior. Subordinate keywords, as opposed to traditional primary keywords, are keywords that are identified as important to the search, but are not necessarily essential for a matched document. They are automatically generated by the system from a variety of places, such as documents clicked on by the user as well as documents that are skipped. The system uses the subordinate keywords to dynamically re-rank thatched documents and advertisements to best reflect the inferred intent of the user in order to continuously provide the most relevant results.

24 Claims, 8 Drawing Sheets

Flowchart of one embodiment of the invention

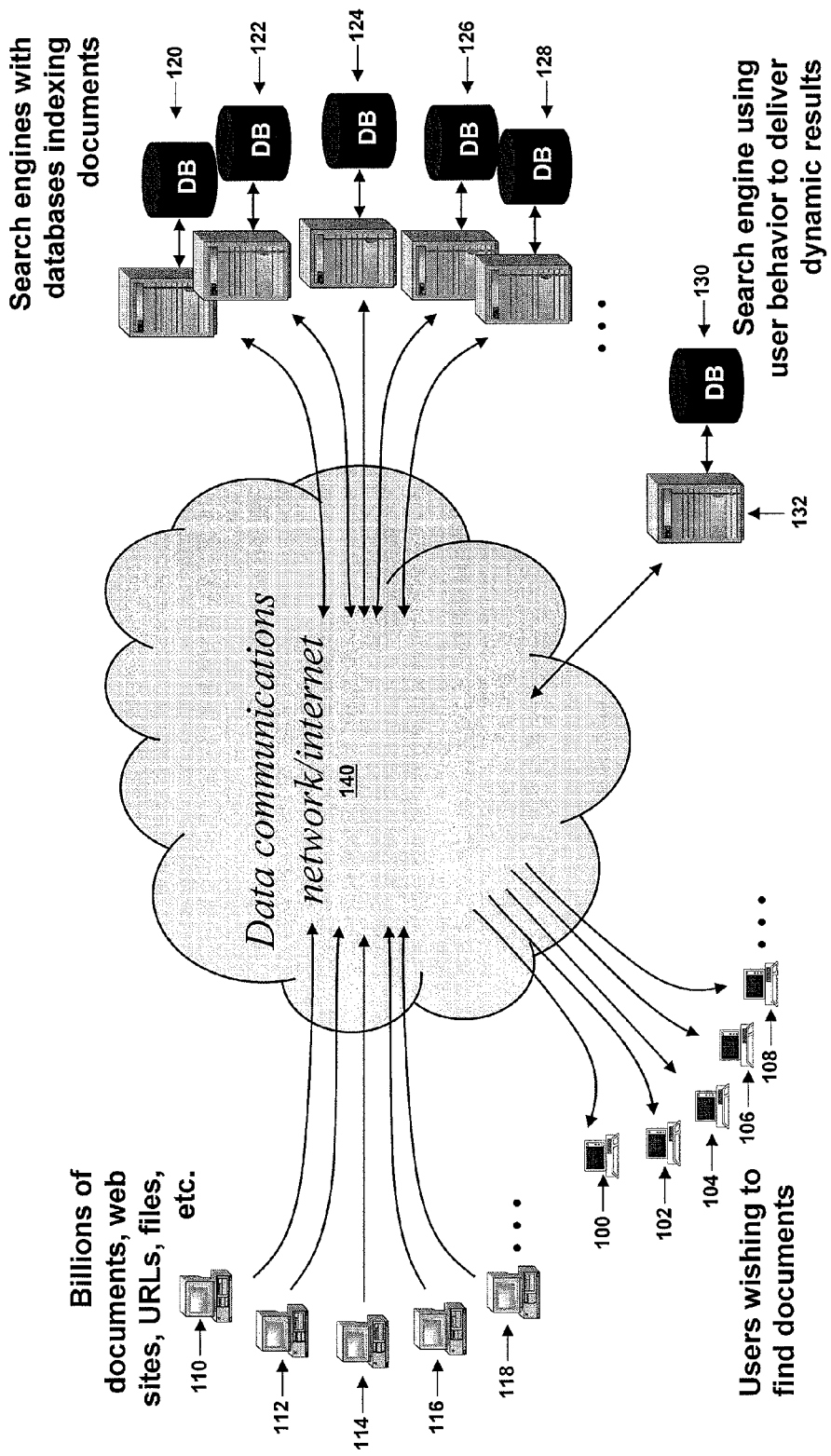
FIG. 1 Embodiment of a system incorporating the present invention

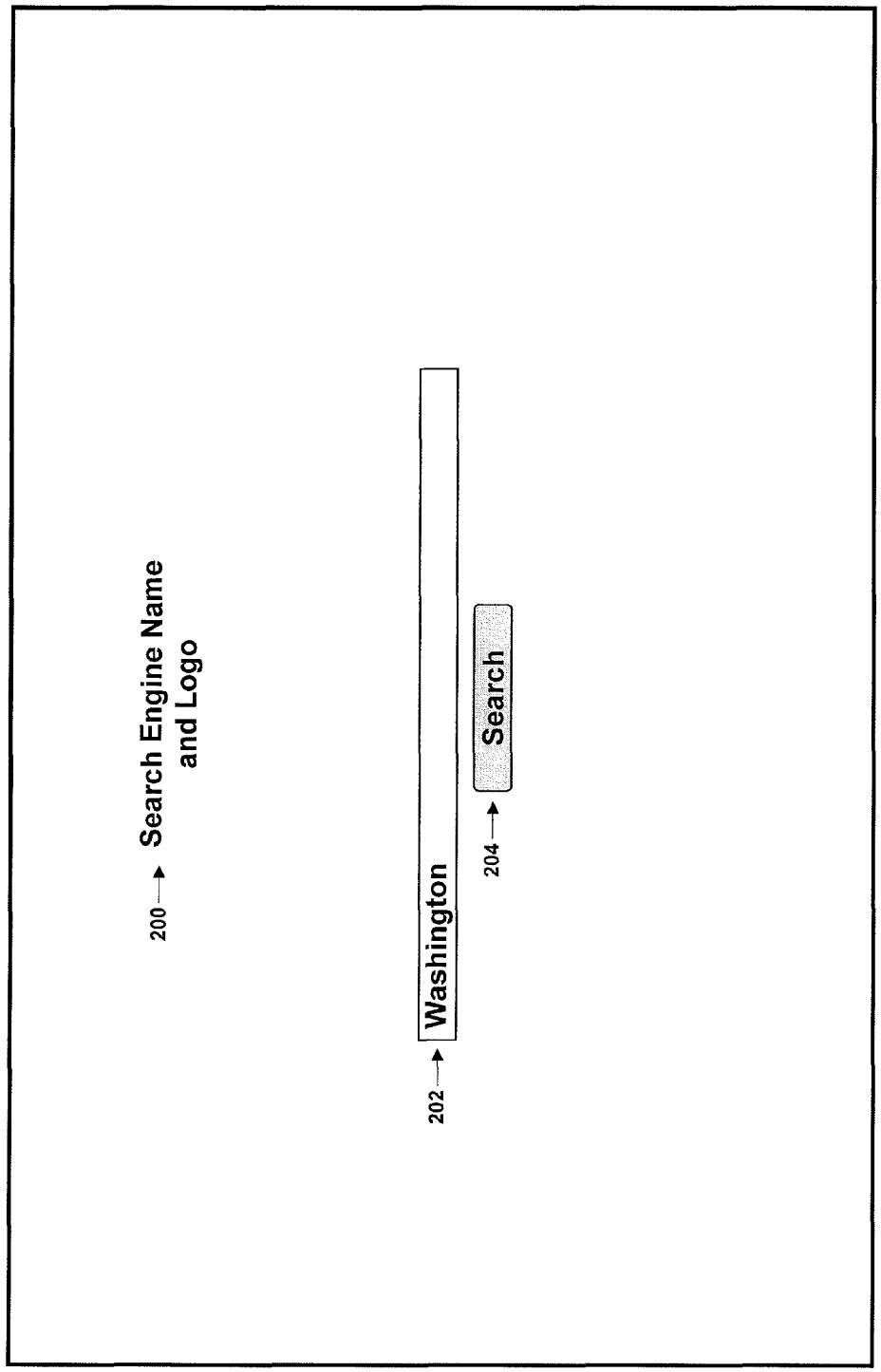

Diagram of one embodiment of the re-ranked search results

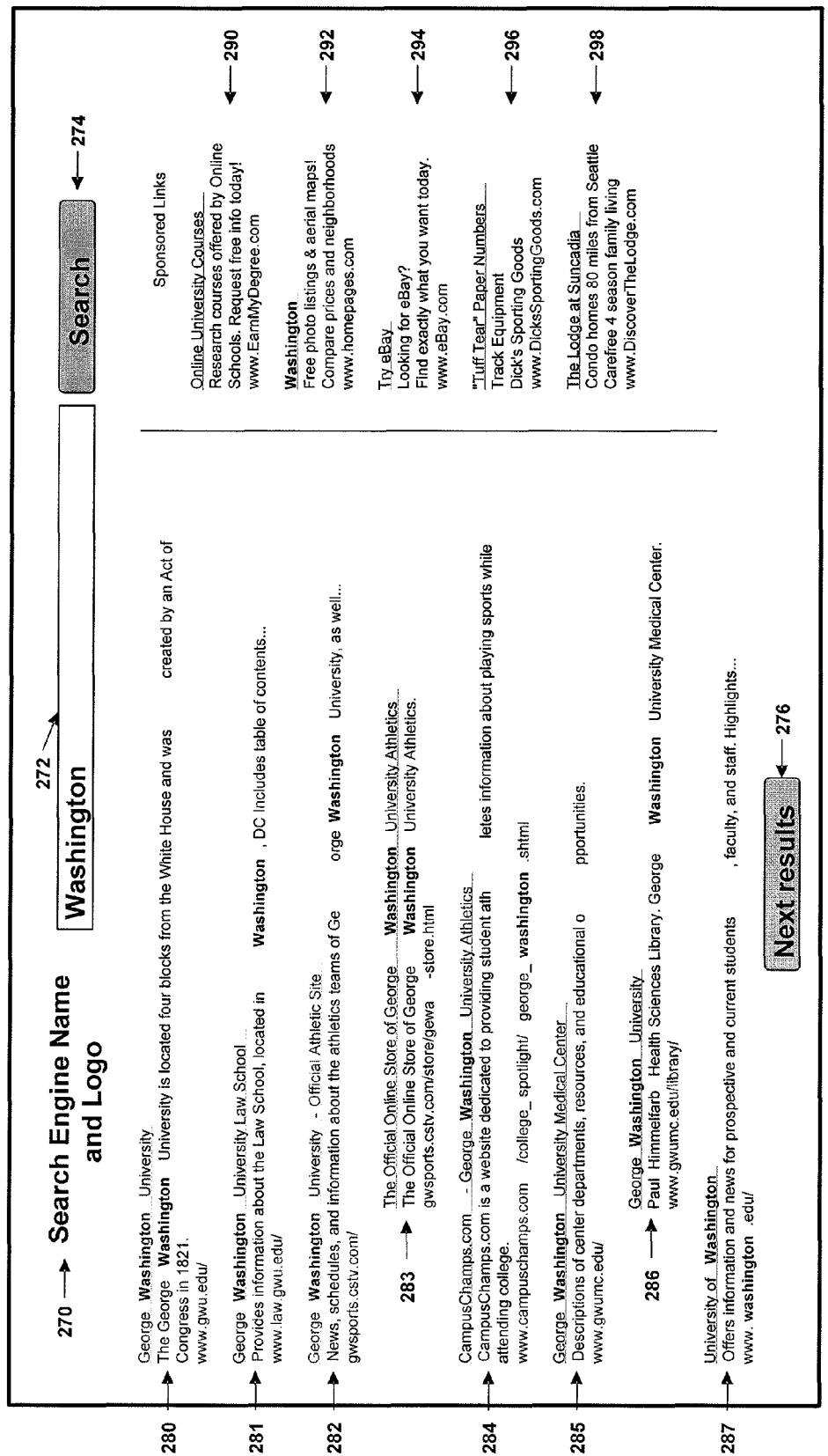
FIG. 2D Diagram of one embodiment of the search results re-ranked again Flowchart of one embodiment of subordinate keyword generation and re-ranking of results Diagram of one embodiment of the advanced search results displaying subordinate keywords

DYNAMIC SEARCH ENGINE RESULTS EMPLOYING USER BEHAVIOR

CROSS-REFERENCES TO RELATED APPLICATIONS

This application is a continuation of U.S. patent application Ser. No. 11/510,524, filed Aug. 25, 2006, entitled "Dynamic Search Engine Results Employing User Behaviour," which application claims the benefit of U.S. Provisional Patent Application No. 60/796,624, filed May 2, 2006, entitled "Dynamic Search Engine Results Using User Behavior," which applications are hereby incorporated by reference in their entirety.

BACKGROUND OF THE INVENTION

The present invention relates to search engines which generate results with improved relevance by monitoring user actions.

Search engines are designed to explore data communications networks for documents of interest to a given user and then generate listings of results based on those documents identified in that search. The user specifies this interest by inputting a query, expressed as a "keyword" or set of "keywords," into the search engine. The keywords are then compared with terms from documents previously indexed by the search engine in order to produce a set of matched documents. Finally, before being presented, the matched documents are ranked by employing any number of different algorithms designed to determine the order with which documents might be relevant to the user. The objective is to quickly point the user toward those matched documents with the greatest likelihood of producing satisfaction.

On the internet (a popular, global data communications network) the number of indexed documents has been growing rapidly due predominantly to improvements in technology and the growth in the quantity of information available. Some queries now return millions of matched documents. As a result, the ability of internet search engines to help users identify documents of particular interest to a given query is being hampered. In other words, while internet users have access to an increasing quantity of potentially relevant information, using keyword queries on search engines to identify those documents that produce satisfaction has become more difficult.

Search engines have thus begun employing many strategies in an attempt to combat this problem. Primarily these consist of improving the algorithms that rank the relevancy of matched documents so that, as the quantity of results increases, those most relevant will still be easily accessible at the top of the list. Some of the major strategies consist of focusing on specific vertical segments, using artificial intelligence to perform contextualized searches, employing personalization, leveraging psychographic, demographic and geographic information and mining the search behaviors of previous users. (Using the behavior of previous users to predict the relevancies of documents for future users has been covered by a number of U.S. patents and applications: 2006/0064411 A1 entitled "Search engine using user intent," U.S. Pat. No. 6,738,764 B2 entitled "Apparatus and method for adaptively ranking search results," and U.S. Pat. No. 6,370,526 B1 entitled "Self-adaptive method and system for providing a user-preferred ranking order of object sets," to name a few.)

While all of these strategies, used either singularly or in combination, provide some benefit, they are incomplete for the simple reason that they do not take into account the behavior of the specific user conducting the search at the moment the search is actually being conducted. Consequently, there is a lot of room to adjust and improve the relevancies of matched documents by examining the behavior of the current user and then responding accordingly in real time.

To illustrate, consider a user who submits a query using the keyword "Washington." Different algorithms, using the strategies mentioned above or potentially others, can be deployed to determine which documents might have the highest probability of being relevant to that specific user for that particular query. By using only information available prior to the submission, however, there is no way of knowing a priori, with any significant degree of certainty, if the user is more interested in "Washington University," "George Washington," or, for that matter, "George Washington University." Thus, while the search engine, employing whatever algorithms and strategies it deems best, attempts to present the results in the most relevant order possible, without additional information from the user there is a substantial chance that the results will be littered with irrelevant documents.

At this point the users' options are limited. They can scan page by page through potentially millions of extraneous matched documents in an attempt to pick out the ones that matter or they can try to identify additional or more specific keywords in an attempt to produce new, and hopefully more relevant, sets of results. Depending on the nature of the search and the ingenuity of the user, this task can often be painstaking and frustrating, if not impossible.

There is therefore a need for a search engine capable of discerning the intent of the specific user currently conducting a search, at the moment that search is being conducted, in order to dynamically modify the search results "on the fly" with the purpose of ranking the matched documents in the most relevant order possible for that user.

SUMMARY OF THE INVENTION

The present invention provides a system for using the behavior of a specific user to dynamically modify search results "on the fly" while the actual search is being conducted. The search engine of the preferred embodiment compiles information with respect to the behavior of the user currently conducting a search in order to infer the intent and interests of that user thereby enabling the search engine to present more pertinent results by dynamically altering, in real time, the relevancies, and thus order, of the matched documents.

In one embodiment, a software application runs as a user interface between a user and a standard third-party search engine, or multiple third-party search engines with the user selecting the preferred. Since the initial results are pulled from the underlying engine they naturally take advantage of all of the technologies and strategies, such as the examples given above, which went into determining the relevancies and ordering of the matching documents in that initial list.

From there, the system infers the intent of the current user by collecting data regarding that user's behavior. In one embodiment, the system infers the user's intent from information gathered by virtue of the user clicking on documents during a search. In another embodiment, other aspects of user behavior, such as subsequent clicks on links within documents, time spent looking at different documents ("dwell time"), time spent looking at domains associated with different documents, downloads, transactions, cursor movements, scrolling and highlighting of text, images or other information, are also monitored and used to infer the intent and interests of the user.

In one embodiment, the inferred intent of the user is characterized by using subordinate keywords. Subordinate keywords, as opposed to traditional primary keywords, are keywords that are identified as important to the search, but are not necessarily essential for a matched document. They are automatically generated by the system from a variety of places, such as documents clicked on by the user during the search process as well as documents that are ignored or skipped by the user.

In one embodiment, the system will then use the subordinate keywords to dynamically re-rank the matched documents "on the fly" to continuously provide the user with the most relevant results possible. The system will additionally use the subordinate keywords to dynamically alter any sponsored links in order to best reflect the intent and interests of the user and, as such, provide the most relevant advertisements and as a result enhance the revenue-generating capability of the system.

The outcome is a dynamic results search engine that is not only capable of taking advantage of all of the intelligence and technology of the underlying search engine that went into generating the initial results, but better equipped to help users find the documents they desire by assisting them in navigating increasingly ponderous lists of matched documents in search results.

BRIEF DESCRIPTION OF THE DRAWINGS

FIG. 1 is a diagram of one embodiment of a system incorporating the present invention.

FIG. 2A is a diagram of one embodiment of the home page.

FIG. 2D is a diagram of one embodiment of the search results re-ranked again.

DETAILED DESCRIPTION OF THE INVENTION

Figure 2B:
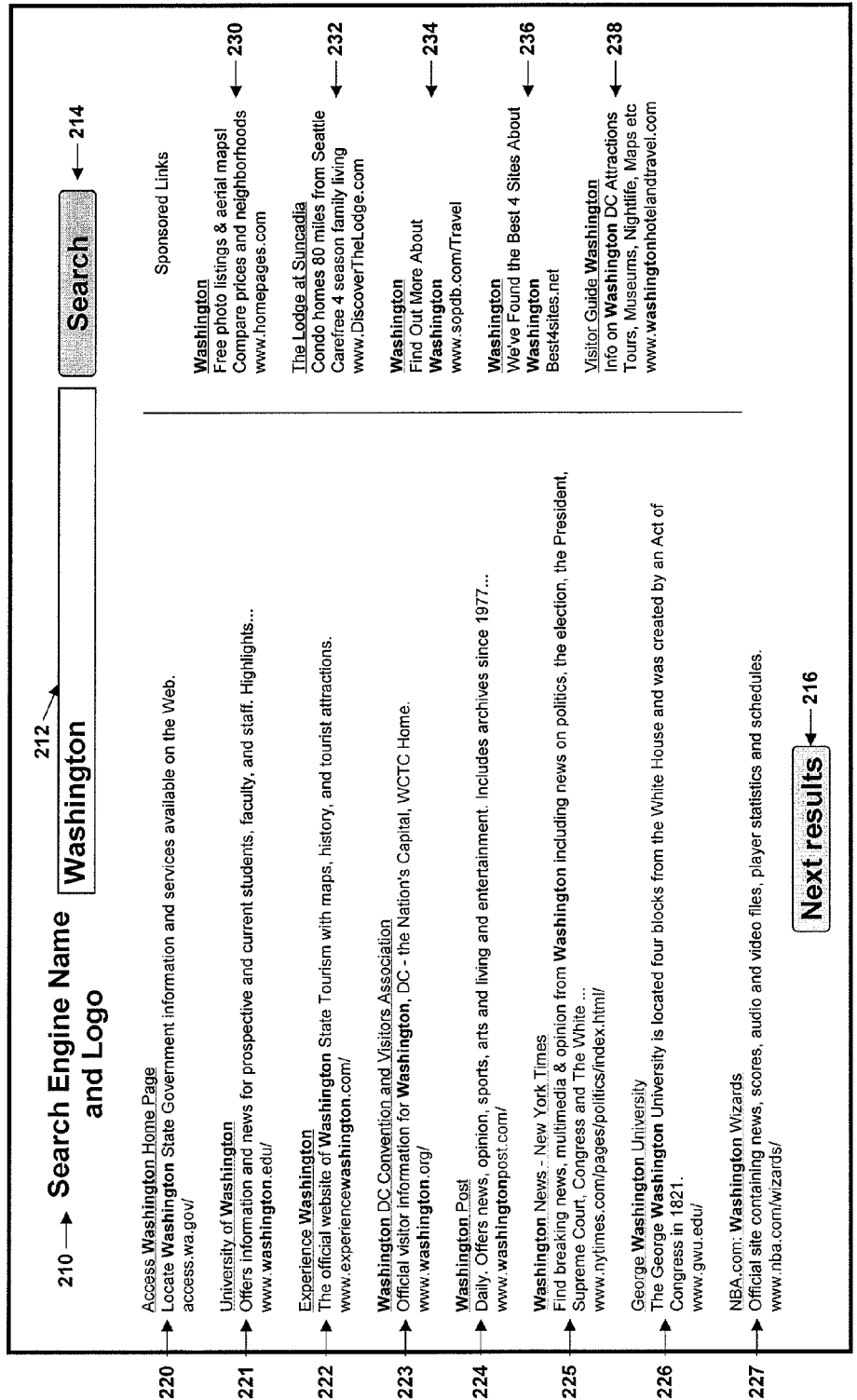
FIG. 2B is a diagram of one embodiment of the initial search results.

The preferred embodiment of the present invention operates on the internet, and more specifically the World Wide Web. The present invention, however, is not limited to the internet, the World Wide Web or any other particular network architecture, software or hardware which may be described herein. The invention is appropriate for any other network architectures, hardware and software. Furthermore, while the following description relates to an embodiment utilizing the internet and related protocols, other networks and protocols, for example, for use with interactive TVs, cell phones, personal digital assistants and the like, can be used as well.

The functions described herein are performed by programs including executable code or instructions running on one or more general-purpose computers. The functions described herein, however, can also be implemented using special purpose computers, state machines and/or hardwired electronic circuits. The example processes described herein do not necessarily have to be performed in the described sequence and not all states have to be reached or performed.

As used herein, the term "website" refers to a collection of content. Website content is often transmitted to users via one or more servers that implement basic internet standards. "Website" is not intended to imply a single geographic or physical location but also includes multiple geographically distributed servers that are interconnected via one or more communications systems.

As used herein, the term "document" is defined broadly and includes any type of content, data or information contained in computer files and websites. Content stored by servers and/or transmitted via the communications networks and systems described herein may be stored as a single document, a collection of documents or even a portion of a document. The term "document" is not limited to computer files containing text but also includes files containing graphics, audio, video and other multimedia data. Documents and/or portions of documents may be stored on one or more servers.

As used herein, the term "click" or "click-through" is defined broadly and refers to clicking on a hyperlink included within search result listings to view an underlying document or website. The term "clicking on" a link or button, or pressing a key to provide a command or make a selection, may also refer to using other input techniques such as voice input, pen input, mousing or hovering over an input area or the like.

The dynamic results search engine of the preferred embodiment compiles information with respect to the behavior of the user currently conducting a search in order to infer the interests and intent of that user thereby enabling the search engine to present more pertinent results by dynamically altering the relevancies, and thus order, of the matched documents "on the fly." The categories of user behavior acquired may include search terms that resulted in click-throughs to particular webpages, websites and sub-domains visited, dwell time, and actions taken at the webpages including document downloads and financial transactions.

FIG. 1 is a high-level illustration of a preferred embodiment of a system incorporating the present invention. Documents on servers or computers 110-118 on a data communication network 140, such as the internet, are scanned and indexed by search engines on computers and associated databases 120-128. On the internet there are currently billions of documents available, with more being added daily. Google, Yahoo!, MSN and Ask are examples of popular internet search engines, but most any web site that enables users to search documents on a data communications network and retrieve relevant results can be considered a search engine. Users on computers or terminals 100-108 seeking information can connect with the search engine of their choice, enter keywords related to their searches, and then retrieve lists of matched documents, normally sorted and ranked by some sort of algorithm that places the ones deemed most relevant at the top. An embodiment of the present invention provides a server 132 and database 130 which plug into the data communications network and then uses the behavior of current users to dynamically alter the results provided by one, if not several, of the other search engines.

The description of this system will focus on a website that takes results from other search engines that reside on the internet, however, another embodiment of the system would involve incorporating the present invention directly into one of the other search engines 120-128. Rather than collecting the search results via a data communications network, the system can gather the results directly from the search engine and then operate accordingly. As discussed briefly below, this embodiment would actually offer some advantages in terms of modifying the rankings of the matched documents. Another embodiment of the system would involve software, which could be made available for download, that resides on the users' computers or terminals 100-108. Now, rather than going to the website of the invention, users can go directly to their search engine of choice and the process of dynamically altering search results will be performed by the software located on the users' computers. Yet another embodiment of the invention involves utilizing its own search engine, as opposed to that of a third-party, should one be available.

FIG. 2A is a diagram of a home page of a preferred embodiment of the invention. While other information and links can be present, the principal purpose of the home page is to enable the user to enter a keyword or set of keywords 202 representing the user's query before clicking on a button 204 to request that the search engine retrieve the results.

FIG. 2B is a diagram of an example of a search results page depicting what the initial search results for the keyword "Washington" might look like. Upon receiving a query 212 from a user, expressed as a keyword or set of keywords, the invention pulls the results 220-227 from another search engine, using publicly available APIs, or some other method, such as, for example, screen scraping, before presenting them to the user. The set of matched documents, and the order in which they are presented, is identical to that of the underlying search engine. It is in this way that the present invention is able to benefit from all of the technologies and strategies used by the underlying search engine when producing the initial search results.

Sponsored links 230-238 are also made available for the purposes of generating revenue for the system and enabling advertisers to offer their products and services. A third-party ad delivery system, such as AdSense from Google, would be one way to accomplish delivering targeted sponsored links. Third-party ad delivery systems either accept keyword submissions or scan the content of a given web page, the search results page in this case, before returning the most relevant ads in their networks. In this way the ads delivered will, to the extent possible, reflect the intent of the current user. Another embodiment would work directly with advertisers by enabling them to purchase keywords before integrating their sponsored links where appropriate. A hybrid approach, involving the implementation of a third-party ad delivery system along with working directly with some advertisers, would be yet another embodiment.

Since the number of matched documents rarely fits on a single page, buttons, such as a next results button 216, are available to enable users to navigate to subsequent pages of results or back to previous pages of results. It should also be noted that there is nothing preventing an embodiment of the system from offering supplemental information on the search results page, as is often the case with search engines, such as related popular queries, suggested spellings or links to maps and stock quotes.

Figure 2C:
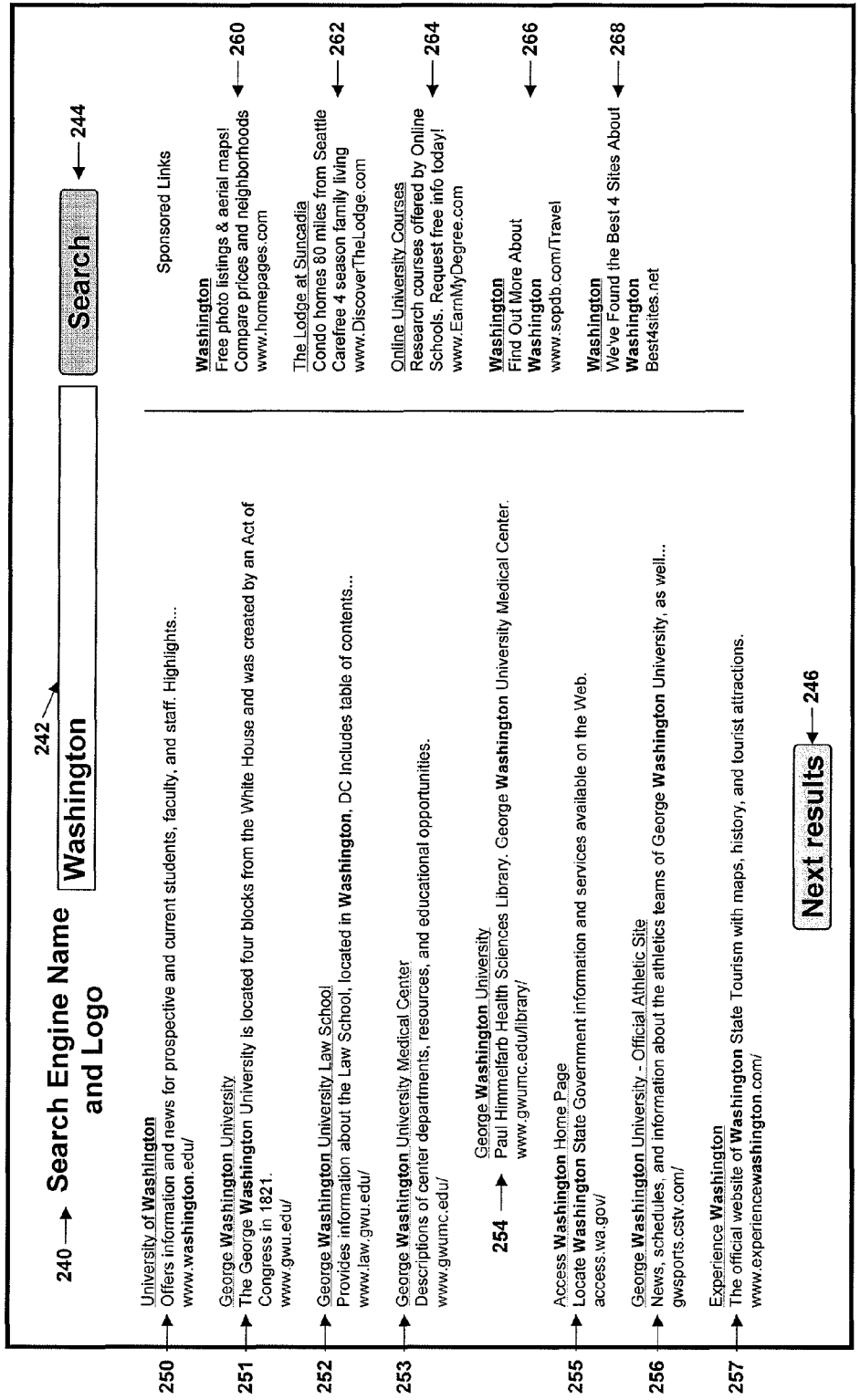
FIG. 2C is a diagram of one embodiment of the re-ranked search results.

FIG. 2C is a diagram of an example of how the first modified results might look after the user clicks on the document "George Washington University" 226 from the initial results as depicted in FIG. 2B and then returns to the search results page. The initial set of matched documents remains the same yet their order has changed based on the intelligence gathered as a consequence of the user's click on the document "George Washington University" 226. The system has determined that the user is most likely interested in Universities named "Washington" as opposed to George Washington the man or Washington the city or state. As a result, the "Access Washington Home Page" document 220, which was initially at the top of the list, has fallen to the sixth position 255 because the system has deemed, based on the user's behavior, that the relevancy of this document has declined. On the other hand, the "University of Washington" document 221, which was initially in the second position, has now moved to the top 250 because the system has deemed, again based on the behavior of the user, that the relevance of this document has increased. This process continues, for all practical purposes, for each document returned in the initial search results. (A discussion regarding practical computation limits is below.)

As the relevancies and thus positions of the matched documents change, the sponsored links 260-268 and their positions also change to more accurately match the intent of the user as deduced by the system based on the user's behavior. While the sponsored link "Visitor Guide Washington" 238 was present in the fifth position on the page with the initial search results in FIG. 2B, it has been removed. Furthermore, the sponsored link "Online University Courses" 264, while not even present in the initial results, is now in the third position. In the preferred embodiment, the sponsored links provided and the order in which they are displayed will be adjusted continuously, once again, based on the user's behavior. Not only will this provide a benefit to the user as more relevant sponsored links are displayed, but the revenue-generating ability of the system will be enhanced as users will be more inclined to click on the more relevant advertising.

FIG. 2D is a diagram of an example of how the second modified results might look after the user clicks on the document "George Washington University—Official Athletic Site" 256 in FIG. 2C and then returns again to the search results page. The order of the search results have once again changed based on this new intelligence gathered with respect to the behavior of the user. The system has determined that the user is most likely interested in athletics at George Washington University. Thus, the "University of Washington" document 287 has now moved to the eighth position after initially being in position two 221 in FIG. 2B and then being moved, subsequent to the user's first action, to position one 250 in FIG. 2C. While the system initially increased the relevance of this document after the first action, it was then decreased after the user's second action. The document "George Washington University" 280 has now moved to the top spot after initially being placed in the seventh position 226 in FIG. 2B and then promoted, subsequent to the user's first action, to the second position 251 in FIG. 2C. This process continues, for all practical purposes, for each document returned in the first modified search results in FIG. 2C.

The sponsored links 290-298 have, once again, changed based on the behavior of the user. "Try eBay" 294 and "'Tuff Tear' Paper Numbers" 296 did not appear with the initial search results FIG. 2B or the search results presented after the user's first action FIG. 2C. The sponsored link "The Lodge at Suncadia" 298, while previously in the second position has been moved down to the fifth position.

Figure 3:
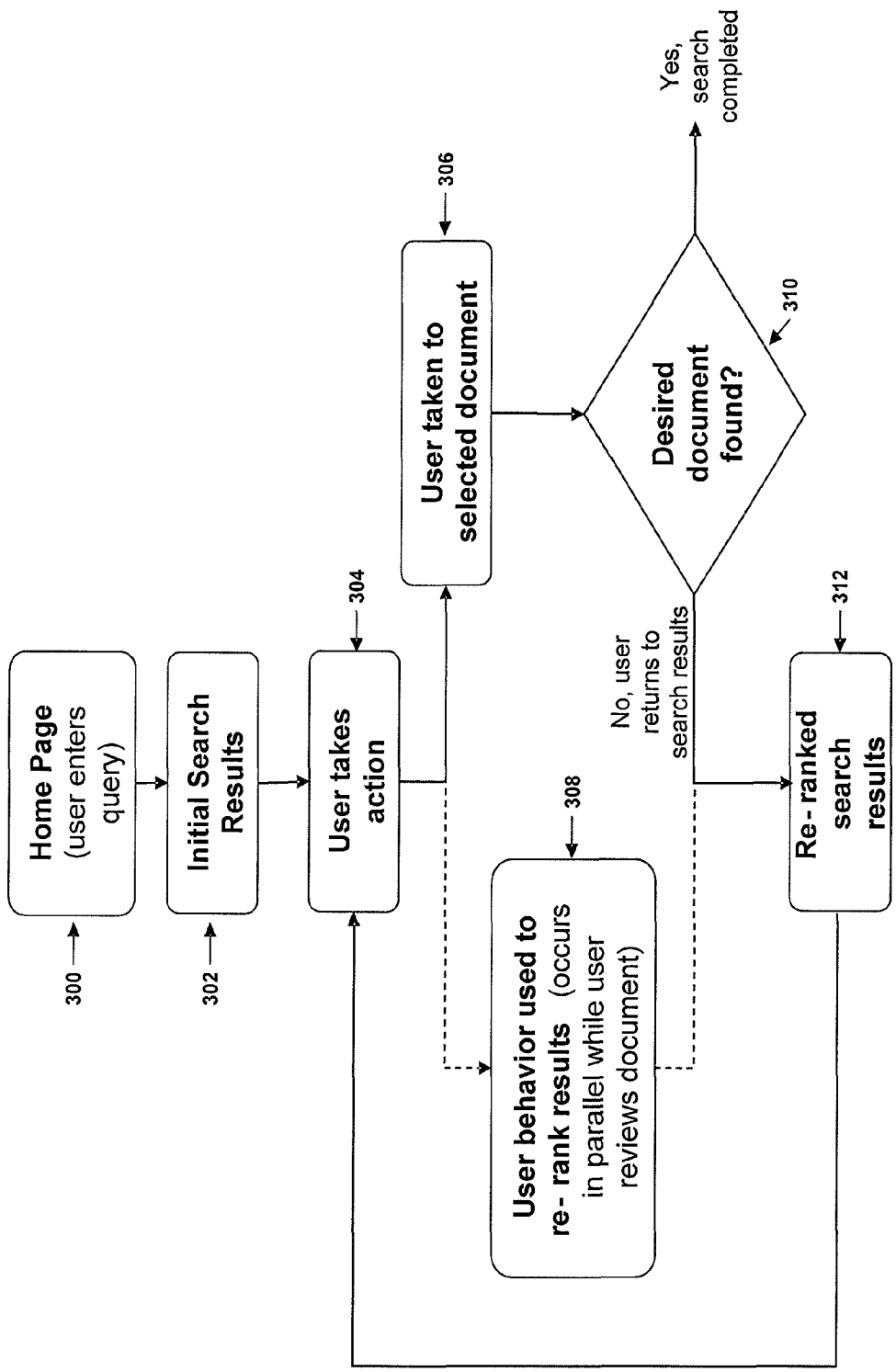
FIG. 3 is a flowchart of one embodiment of the invention.

FIG. 3 is a flowchart of one embodiment of the invention. The user's experience begins on the inventions home page 300 as depicted in FIG. 2A. After entering a query, expressed as a keyword or set of keywords, the system produces an initial set of search results 302 as depicted in FIG. 2B. These results can be supplied by any third-party search engine or internally should the system comprise its own search engine.

Once the initial search results are presented, the system begins collecting information regarding the user's behavior in an effort to divine the user's intent and interests and then adjust the results accordingly. Data regarding user behavior immediately following the initial search comes from anything related to the activity of the user, including, but not limited to, clicks on various links in the search results as well as subsequent clicks on links within documents, skipped links in the search results, dwell times, time spent looking at documents from specific domains, resources accessed, transactions conducted, purchases made, orders placed, sessions created, documents downloaded, cursors moved, pages scrolled or text, images or other information highlighted, or any combination thereof. In general, the more time spent looking and conducting activities at a particular website, the more relevant that website is to the user.

The process continues by the user taking some form of action 304 such as selecting a document or going to the next page of results. In the case of selecting a document, the user is taken to that document so that it can be reviewed. While the document is being reviewed, the system will simultaneously take information collected regarding the user's behavior to re-rank the initial search results 308. If the user finds the desired document 310 on the first try, then the user is satisfied and the process is completed. However, should the user return to the search results page to continue the search process, the new search results, having been re-ranked while the user was away, will be displayed 312 as depicted in FIG. 2C. The process then proceeds with the user performing different actions while the system continues to collect data regarding the user's behavior in order to deduce the user's intent and then appropriately re-rank the search results. Each time the user returns to the search results page, the matched documents will have been re-ranked based on new intelligence gleaned from the user's behavior.

The primary mechanism for expressing the deduced intent of the user is through the use of "subordinate" keywords. Users typically execute queries with search engines by submitting a set of "primary" keywords. These primary keywords are matched by the search engines with their sets of indexed documents to produce lists of results which are then prioritized using any number of different relevancy algorithms. The matched documents produced, however, must, in one way or another, contain all of the primary keywords submitted for the query. In other words, the primary keywords are "all or nothing;" those documents that do not include the complete set of primary keywords are excluded. Subordinate keywords, on the other hand, are keywords that are identified as important but are not necessarily essential to the query. They enable the system to give preferential treatment to (i.e. increase the relevancy of) documents that contain a subset of those keywords without necessarily eliminating those that do not.

While many search engines offer "advanced" search functionality that enables users to specify, for example, keywords that are not to appear or a set of keywords where at least one must be present, these techniques are complex and, even with a bit of manipulation, cannot be used to emulate the functionality or utility of subordinate keywords. Users who are sophisticated enough to avail themselves of the advanced search functionality commonly offered by search engines will still receive significant advantages from the present invention.

Figure 4:
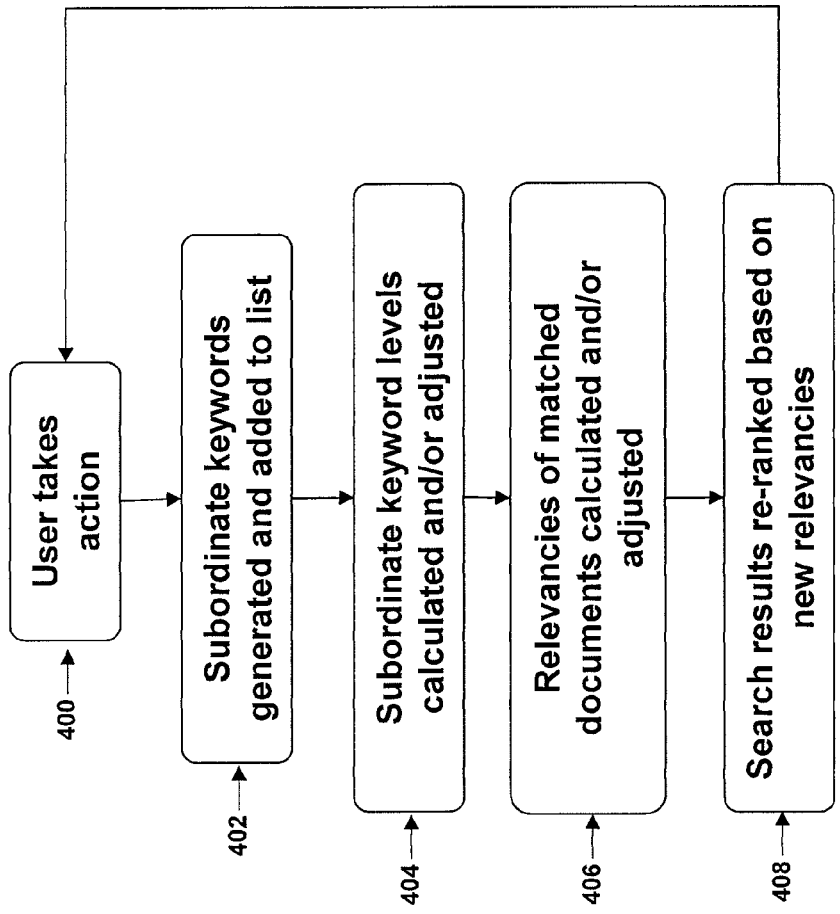
FIG. 4 is a flowchart of one embodiment of subordinate keyword generation and re-ranking of results.

FIG. 4 is a flowchart of one embodiment of the process of generating subordinate keywords and re-ranking search results. As mentioned previously, when the user takes some sort of action 400 such as selecting a document or continuing to another page of results, the system generates subordinate keywords which are then added to the list of any that might already exist (step 402). Based on where the subordinate keywords appear and with what frequency, the system then assigns weights to, or adjusts the weights of, each subordinate keyword (step 404). These subordinate keywords, with their associated weights, are then used to adjust the relevancies of the documents in the search results (step 406). The new relevancies will be a function of the old relevancies in addition to a function of the weights, frequencies and locations of appearances of the subordinate keywords in each of the matched documents. The new relevancies are then used to dynamically re-rank the documents in the search results (step 408) with the effect of moving the most relevant documents up while pushing the least relevant down.

Subordinate keywords are automatically generated by the system from a variety of places, including, but not limited to, links clicked on by the user, other links associated with the document such as links pointing to the document, "descriptive text" associated with each document in the search results, meta-tags connected to viewed documents, and prominent words and phrases in viewed documents. (As is common practice with search engines, "stop words," defined as those words which are so common that they are useless to index, are ignored.) A thesaurus can also be used to generate similar words and phrases that might be of interest to the user. Since subordinate keywords are simply an expression of important ideas, and do not as such eliminate any matched documents from the results of a query, they can be employed with abundance. In fact, the more subordinate keywords are generated from the user's behavior, the more likely the system is to find the most relevant documents and move them to the top of the search results.

For example, one embodiment of the system might generate subordinate keywords from every word in the title and display text of any document selected by virtue of a user's click. In FIG. 2B the title and display text for document 226 are, respectively, "George Washington University" and "The George Washington University is located four blocks from the White House and was created by an Act of Congress in 1821." Therefore, if N represents the number of subordinate keywords generated, $sk_n$ represents the $n^{th}$ subordinate keyword and $s_n$ represents the number of times that the $n^{th}$ subordinate keyword appears in the title and display text of the selected document, then TABLE I is a demonstration of the subordinate keywords generated from clicking on document 226:

TABLE I

| n | $sk_n$ | $s_n$ |
|---|--------|-------|
| 1 | george | 2 |
| 2 | university | 2 |
| 3 | located | 1 |
| 4 | four | 1 |
| 5 | blocks | 1 |
| 6 | white | 1 |
| 7 | house | 1 |
| 8 | created | 1 |
| 9 | act | 1 |
| 10 | congress | 1 |
| 11 | 1821 | 1 |

(It should be noted that "Washington" is not a subordinate keyword because it is a primary keyword 212.)

The next step is to assign "weights" to each subordinate keyword. Some subordinate keywords will undoubtedly be more important than others and assigning weights will enable the system to more accurately express the deduced intent of the user. The weight of each subordinate keyword is determined based on a number of factors, including, but not limited to, the placements of the keyword and frequencies with which it appears in the links, descriptive text, meta-tags or any other information associated with documents referred to by the user, including the documents themselves.

Depending upon the behavior of the user, subordinate keywords can even be deemed to have negative weights, meaning that they represent ideas in which the user is not interested. In one embodiment of the system, negative keywords are generated from the titles and display texts of documents that are passed over by the user. For example, if the user were to click on the fourth document in a list of results, it can be inferred from the user's behavior that there is little or no interest in the information presented in the first three results. As such, any subordinate keywords present in the titles and display texts of the first three documents can be given a negative weight.

In one embodiment, subordinate keyword weights are further adjusted by soliciting feedback from the user with respect to each document viewed. By requesting that the user indicate, on a scale, for example, the usefulness of a document just viewed, the system can adjust the extent to which the weights of the subordinate keywords associated with that document are raised or lowered. In the absence of such feedback, other information regarding the user's behavior, such as dwell time and any sort of activity, can be used to infer to what extent viewed documents are interesting to the user.

In any event, the weight of a given subordinate keyword will be a function that takes into account the locations and frequencies of its appearances. Subordinate keywords that appear in some places, such as titles or display texts, may be given more weight than if they had appeared elsewhere, such as buried in selected documents. Furthermore, subordinate keywords that appear in important documents may be given more weight than if they had appeared in less important documents.

If $l_n$ represents the weight of the $n^{th}$ subordinate keyword and $a_n$ through $z_n$, and possibly beyond, represent the frequency with which $sk_n$ appears in various places in specific documents, such as titles, descriptive texts, links, meta-tags and so forth, then the following represents a generalized formula for calculating subordinate keyword weights:

$$l_n = f_1(a_n) + f_2(b_n) + f_3(c_n) + \ldots$$

One embodiment of the system might make the weight of a subordinate keyword a function of the number of times it appears in the titles or display texts of documents that have been selected by virtue of a user click. As such, the following formula, using the arctangent function to provide a mechanism for having the weights asymptotically approach a given value as the frequency of appearances increases, could be used to generate weights in the range of −100 to +100:

$$l_n = (200/\pi)\tan^{-1}(s_n/3)$$

(The purpose of asymptotically approaching a given value is to steadily decrease the impact of the marginal appearance so that no one keyword overwhelms the others.)

Using the data from TABLE I, TABLE II indicates the weights that would be associated with each subordinate keyword by employing the formula above:

TABLE II

| n | $sk_n$ | $s_n$ | $l_n$ |
|---|---|---|---|
| 1 | george | 2 | 37 |
| 2 | university | 2 | 37 |
| 3 | located | 1 | 20 |
| 4 | four | 1 | 20 |
| 5 | blocks | 1 | 20 |
| 6 | white | 1 | 20 |
| 7 | house | 1 | 20 |
| 8 | created | 1 | 20 |
| 9 | act | 1 | 20 |
| 10 | congress | 1 | 20 |
| 11 | 1821 | 1 | 20 |

Continuing this example, if the user's second click was on document 256 in FIG. 2C, with the title "George Washington University—Official Athletic Site" and display text "News, schedules, and information about the athletics teams of George Washington University, as well," the subordinate keywords with their associated weights would look like TABLE III:

TABLE III

| n | $sk_n$ | $s_n$ | $l_n$ |
|---|---|---|---|
| 1 | george | 4 | 59 |
| 2 | university | 4 | 59 |
| 3 | located | 1 | 20 |
| 4 | four | 1 | 20 |
| 5 | blocks | 1 | 20 |
| 6 | white | 1 | 20 |
| 7 | house | 1 | 20 |
| 8 | created | 1 | 20 |
| 9 | act | 1 | 20 |
| 10 | congress | 1 | 20 |
| 11 | 1821 | 1 | 20 |
| 12 | official | 1 | 20 |
| 13 | news | 1 | 20 |
| 14 | schedules | 1 | 20 |
| 15 | information | 1 | 20 |
| 16 | athletics | 2 | 37 |
| 17 | teams | 1 | 20 |

Once the subordinate keywords have been generated and each assigned with an appropriate weight, the data is utilized to re-rank the matched documents in the search results. Documents are increased (or decreased) in importance and moved up (or down) in the prioritization of the search results based on their association with the subordinate keywords. With the goal of dynamically re-ranking the search results to best reflect the deduced intent of the user, a ranking algorithm must be developed and then tuned to specify the impact that each subordinate keyword has on the movement of the documents in the search results.

The ranking function will run through the search results and adjust the rank of each matched document based on which subordinate keywords are associated with each document, taking into account the weights of each as well as where exactly they are found. The ranking function will, naturally, also take into account the previous rank of the document, helping to reflect, in some way, the intelligence that went into producing the initial order of the search results. Much as the weights of the subordinate keywords were based on where and how often those keywords appeared in relation to the selected, or skipped, documents, the movement of matched documents in the search results will similarly depend on where the subordinate keywords appear. A document with a large number of high-weight subordinate keywords in its title, display text and meta-tags will perhaps move much more dramatically than a document with a few low-weight subordinate keywords buried deep within the text of the document. It should also be noted that the presence of subordinate keywords with positive weights will increase the relevancy of the document, moving it up in the rankings, while the presence of subordinate keywords with negative weights will decrease the relevancy and have the opposite effect.

Thus, if M represents the number of matched documents returned by a given query and $r_m$ represents the rank of the $m^{th}$ document then the generalized ranking function will look as follows:

$$R(m) = f_R(r_m) + \sum_{n=1}^{N} f_{R1}(a_n, l_n) + f_{R2}(b_n, l_n) + f_{R3}(c_n, l_n) + \ldots$$

Since the actual relevancy scores as determined by the underlying search engine are not necessarily available, the ranks of the matched documents serve as a proxy for relevancy. However, if the underlying search engine were to share the calculated relevancy scores of the matched documents, via some method of communication such as an API, or if the invention was actually incorporated into the underlying search engine itself, then those relevancy scores could be used for $r_m$, in place of the rank, potentially increasing the effectiveness of the system.

To illustrate, if $t_m$ and $d_m$ represent, respectively, the title and display text of the $m^{th}$ document, then TABLE IV is a depiction of the first eight search results as demonstrated in FIG. 2B:

TABLE IV

| m | $r_m$ | $t_m$ | $d_m$ |
|---|---|---|---|
| 1 | 1 | Access Washington Home Page | Locate Washington State Government information and services available on the Web. |
| 2 | 2 | University of Washington | Offers information and news for prospective and current students, faculty, and staff. Highlights . . . |
| 3 | 3 | Experience Washington | The official website of Washington State Tourism with maps, history, and tourist attractions. |
| 4 | 4 | Washington DC Convention and Visitors Association | Official visitor information for Washington, DC - the Nation's Capital, WCTC Home. |
| 5 | 5 | Washington Post | Daily. Offers news, opinion, sports, arts and living and entertainment. Includes archives since 1977 . . . |
| 6 | 6 | Washington News - New York Times | Find breaking news, multimedia & opinion from Washington including news on politics, the election, the President, Supreme Court, Congress and The White . . . |
| 7 | 7 | George Washington University | The George Washington University is located four blocks from the White House and was created by an Act of Congress in 1821. |
| 8 | 8 | NBA.com: Washington Wizards | Official site containing news, scores, audio and video files, player statistics and schedules. |

One embodiment of the system might use a ranking function that makes the new rank of a document equal to its previous rank plus some function of the subordinate keywords that appear in the document's title and display text. Where $W_r$ and $W_s$ represent constant weights and Er and Es represent constant exponents, such a ranking function, using the sgn( ) and absolute value functions to handle negative subordinate keyword weights, could be displayed as follows:

$$R(m) = W_r r_m^{Er} + \sum_{n=1}^{N} \left( \begin{array}{c} \text{number of occurrences} \\ \text{of } sk_n \text{ in } t_m \text{ and } d_m \end{array} \right) W_s \text{sgn}(l_n) |l_n|^{Es}$$

The values of the constants in the ranking function will be developed by careful analysis of empirical user data. The objective is to determine these values in order to optimize the movement of documents and minimize the amount of searching required by the user to find the desired information. One embodiment of the invention uses empirical user data as it is collected to refine the values of the constants in real time. By identifying the end of a successful search, possibly but not necessarily with the help of feedback from the user, the system could, over time, adjust the values of the constants in order to maximize the percentage of searches that end successfully while minimizing the time required to complete a successful search. In one embodiment the constants are actually customized for each user, representing how different users behave differently, and stored in a user profile or cookie. In another embodiment, the constants also depend on other information such as the number of matched documents, which underlying search engine is being used, the language of the results, the country where the user is located, or virtually any other variable.

To illustrate how the ranking function works, when the subordinate keywords in TABLE II are applied to the search result documents in TABLE IV, while setting $W_r$, Er and Es to 1 and $W_s$ to $-½$, the new rankings, R(m), are produced as displayed in TABLE V:

TABLE V

| m | $r_m$ | R(m) | $t_m$ | $d_m$ |
|---|---|---|---|---|
| 1 | 1 | −9 | Access Washington Home Page | Locate Washington State Government information and services available on the Web. |
| 2 | 2 | −16½ | University of Washington | Offers information and news for prospective and current students, faculty, and staff. Highlights . . . |
| 3 | 3 | 3 | Experience Washington | The official website of Washington State Tourism with maps, history, and tourist attractions. |
| 4 | 4 | 4 | Washington DC Convention and Visitors Association | Official visitor information for Washington, DC —the Nation's Capital, WCTC Home. |
| 5 | 5 | 5 | Washington Post | Daily. Offers news, opinion, sports, arts and living and entertainment. Includes archives since 1977 . . . |
| 6 | 6 | −14 | Washington News - New York Times | Find breaking news, multimedia & opinion from Washington including news on politics, the election, the President, Supreme Court, Congress and The White . . . |

TABLE V-continued

| m | $r_m$ | R(m) | $t_m$ | $d_m$ |
|---|---|---|---|---|
| 7 | 7 | −157 | George Washington University | The George Washington University is located four blocks from the White House and was created by an Act of Congress in 1821. |
| 8 | 8 | 8 | NBA.com: Washington Wizards | Official site containing news, scores, audio and video files, player statistics and schedules. |

Using the first document (m=1) as an example, the only subordinate keyword from TABLE II found in either the title, $t_1$, or display text, $d_1$, is "locate." (Techniques, such as stemming, should be employed to, where appropriate, enable the broad matching of terms so that, for example, "located"="locate." Artificial intelligence and contextualized matching can also be used to further enhance the term-matching ability of the system.) Since the weight of the subordinate keyword is 20, the ranking equation is thus $1+1\times-\frac{1}{2}\times20=-9$. Using the second document (m=2) as another example, the only subordinate keyword from TABLE II found in either the title, $t_2$, or display text, $d_2$, is "university," which has a weight of 37. The ranking equation is thus $2+1\times-\frac{1}{2}\times37=-16\frac{1}{2}$. Finally, the seventh document (m=7) represents a more complicated example. The two words "george" and "university," with weights of 37, both appear twice in the title, $t_7$, and display text, $d_7$. The nine words "located," "four," "blocks," "white," "house," "created," "act," "congress," and "1821" all appear once in the display text, $d_7$, and have weights of 20. The ranking function is thus $7+(2\times-\frac{1}{2}\times37)\times2+(1\times-\frac{1}{2}\times20)\times9=-157$.

When sorted by R(m), and then resetting the values of $r_m$ for the new rankings, the documents are rearranged as shown in TABLE VI:

Some of the new rankings are obviously negative. This does not present a problem, however, since the matched documents are simply ordered from the lowest ranking to the highest. It should also be noted that the calculations in TABLES V and VI will have to be executed on all of the results as opposed to just the first eight, or even just those on the first page of the search results, as it is likely that documents from subsequent pages will be moved forward while others dropped back.

As a practical matter, computational limitations imposed by the server hosting the invention software might prohibit running the ranking algorithm on all of the matched documents generated by a query, especially if there are millions of them. Not only is processor speed required to execute all of the calculations, but the server memory might need to be large enough to hold all of the results. Fortunately, the ranking algorithm can be run on a fairly large number of matched documents, the first several hundred or thousand for example, without significantly impacting the effectiveness of the system. Should a determined user page through a large proportion of those re-ranked documents, the system can simply grab the next batch of several hundred or thousand and quickly re-rank those with the previous batch. In any event, it is important to run as many computations as possible in the

TABLE VI

| m | $r_m$ | R(m) | $t_m$ | $d_m$ |
|---|---|---|---|---|
| 1 | −157 | −157 | George Washington University | The George Washington University is located four blocks from the White House and was created by an Act of Congress in 1821. |
| 2 | −16½ | −16½ | University of Washington | Offers information and news for prospective and current students, faculty, and staff. Highlights . . . |
| 3 | −14 | −14 | Washington News - New York Times | Find breaking news, multimedia & opinion from Washington including news on politics, the election, the President, Supreme Court, Congress and The White . . . |
| 4 | −9 | −9 | Access Washington Home Page | Locate Washington State Government information and services available on the Web. |
| 5 | 3 | 3 | Experience Washington | The official website of Washington State Tourism with maps, history, and tourist attractions. |
| 6 | 4 | 4 | Washington DC Convention and Visitors Association | Official visitor information for Washington, DC —the Nation's Capital, WCTC Home. |
| 7 | 5 | 5 | Washington Post | Daily. Offers news, opinion, sports, arts and living and entertainment. Includes archives since 1977 . . . |
| 8 | 8 | 8 | NBA.com: Washington Wizards | Official site containing news, scores, audio and video files, player statistics and schedules. | background while the user is reading or reviewing documents in order to avoid imposing delays on the user.

Should the ranking function take into account the presence of subordinate keywords in the actual documents, this could additionally require a significant amount of bandwidth and processing power as each document is downloaded and reviewed. A computational and time-saving technique, however, would be to use the power of the underlying search engine, or even another search engine, to accelerate the speed with which subordinate keywords are identified in matched documents. Rather than scanning all of the matched documents for the presence of subordinate keywords, the system can, in the background, run queries using the subordinate keywords, or just the most important thereof to save on computational time, in order to quickly determine which of the matched documents contain the recently generated subordinate keywords. At this point all that is required is a simple corresponding of the initial matched documents with the results generated by the subordinate keyword queries. The ranking function can then quickly take into account the presence of subordinate keywords in the matched documents themselves and adjust the rankings accordingly.

Figure 5:
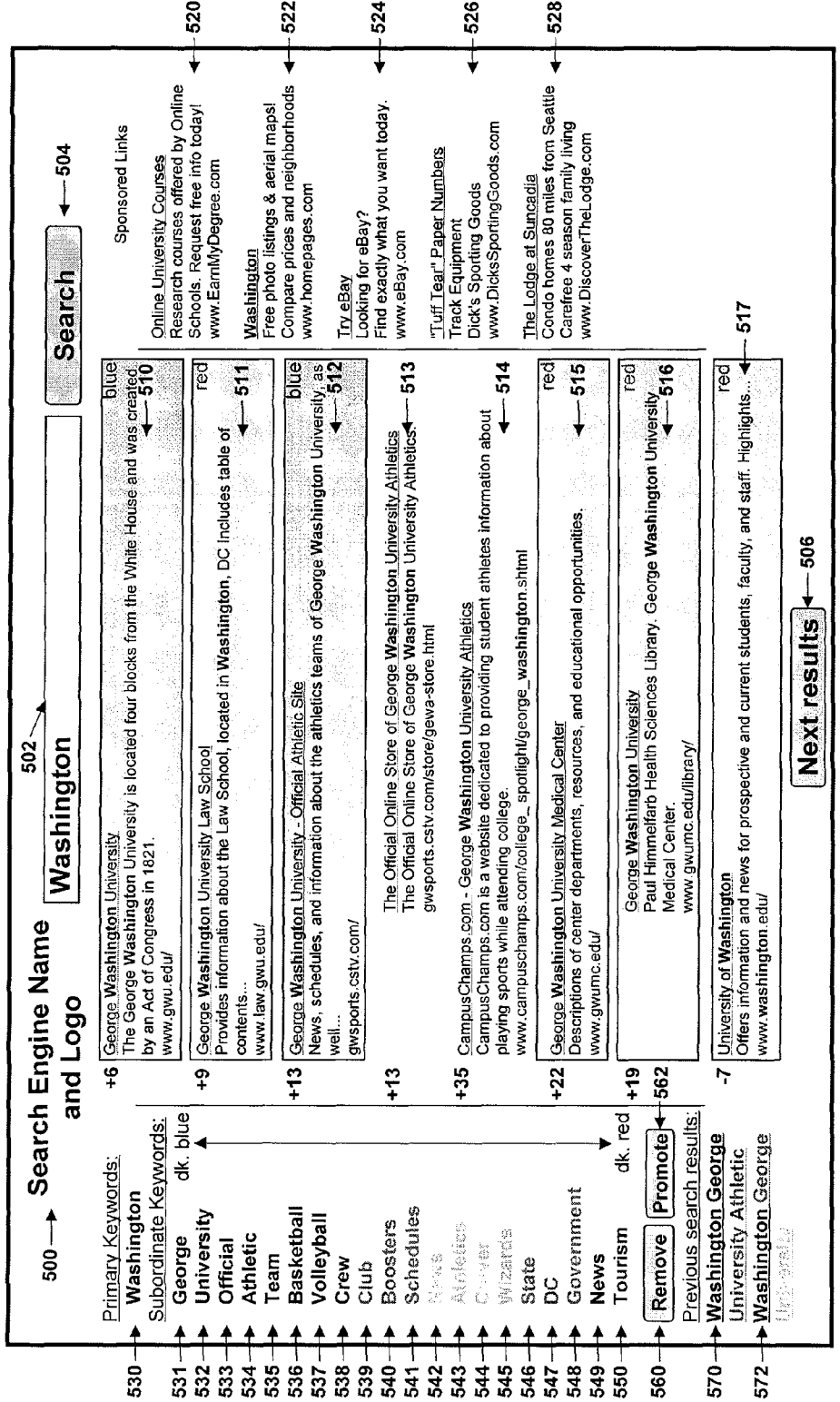
FIG. 5 is a diagram of one embodiment of the advanced search results displaying subordinate keywords.

FIG. 5 is a diagram of one embodiment of an "advanced search" page of the invention that actually displays the subordinate keywords to the user. While the matched documents 510-516 and the sponsored links 520-528 are the same, an "information bar" on the left-hand side contains the primary keywords 530 and subordinate keywords 531-550 currently employed. The subordinate keywords can be shown in color, with blue representing positive subordinate keywords and red representing negative subordinate keywords. While the actual color is not important, the intensity of the color corresponds with the weight: the more intense the color, the more the weight is either positive or negative. The subordinate keywords would thus be listed from dark blue (very positive) to dark red (very negative).

Displaying the subordinate keywords can be beneficial to the user for a couple of reasons: not only does this give insight into how the system is operating, but users can then assist the system in locating relevant documents by either manually removing or promoting specific subordinate keywords. Should the user know that a particular subordinate keyword is not relevant to the query, that keyword can be selected and then removed by pressing the "remove" button 560. Should the user see a subordinate keyword that is deemed more than just important, but essential, to the query, it can be selected and then promoted to a primary keyword by pressing the "promote" button 562. Once any set of keywords is promoted to primary the initial search will have to be rerun by returning to the underlying search engine for a new set of results. That being said, all of the remaining subordinate keywords and weights can be carried forward with the new set of search results being adjusted accordingly.

Since the order of the matched documents changes every time a user returns to the search results page, "bread crumbs" linking to previous search results pages 570-572 will enable the user, if so desired, to go back to previous rankings of matched documents. Additionally, since this system is a novel approach to assisting the user to find relevant documents, the movement of the matched documents might initially be confusing. Nevertheless, a few things can thus be done with the user interface to help ease the transition. "Movement indicators" can be placed immediately to the left of document titles 510-517 to indicate how the documents have moved since the last visit to the search results page (+6, +9, +13, etc.). Also, to further highlight which documents have already been clicked or skipped, boxes of one color, such as blue, can be put around documents that have already been clicked 510 and 512 while boxes of another color, such as red, can be put around documents that have previously been skipped 511 and 515-517. Finally, upon returning to the search results page, the user can be placed at the first document that has yet to be selected or skipped. This will help the user to identify documents that have leapt high in the rankings before continuing with the search process. Other techniques for helping the user understand the process of dynamically changing search results may also be envisioned and implemented.

It should be emphasized, as stated earlier, that the sponsored links 520-528 also change dynamically based on the deduced intent of the user. A third-party sponsored link service, that either accepts keyword submissions or scans the content of a page, can take subordinate keywords into account to deliver relevant advertisements. Whether a third-party sponsored link service is used or not, subordinate keywords, since they are a representation of the deduced intent of the user, should be used to dynamically alter the sponsored links that are displayed. To the extent possible, the system should devise techniques for having the selection of sponsored links take the subordinate keywords into consideration. Increasing the accuracy of targeted advertisements that are displayed will have the dual benefit of improving the user experience while increasing the revenue generated by the system.

The outcome is thus a dynamic results search engine that continuously changes, updates and reorganizes search results based upon the intent of the user as deduced from the ongoing behavior of the user during the search process. As the user clicks on links, views documents, executes transactions, downloads files, scrolls pages, adds or subtracts keywords (some of which can be taken from generated subordinate keywords), executes other queries, or performs almost any kind of activity, the system takes this information, deduces the intent of the user, generates subordinate keywords and assigns weights to them before then reprioritizing the search results "on the fly." The end result is a dynamic results search engine better able to assist users in finding desired documents and information.

In one embodiment, user behavior monitoring is done by a first software module on server 132 in FIG. 1. The behavior information is provided to a second, re-ranking software module on server 132. The re-ranking module modifies the rankings of search results received from a third-party search engine and stores the re-ranked results on database 130. The re-ranking software module also performs the highlighting, showing of ranking movement, displaying of subordinate keywords, and other functions not performed by the monitoring software module or the third-party search engine. The re-ranked search results are supplied to a client browser on the user's computer. The client browser software may perform some of the customized display functions of the invention.

In one embodiment, the re-ranking software module works in parallel with user actions, performing re-ranking while the user behavior is being monitored. A series of re-ranked results can be created and stored in database 130 as the user clicks through documents. If the user decides that a particular document is not relevant, then the re-ranking module takes the subordinate keywords associated with that document, make their weights negative, and pushes the document (and other that are similar) down.

The user browser may be installed on other devices than a computer, such as a personal digital assistant (PDA), a mobile phone, or any other device. The display can be modified to fit a smaller form factor, such as by providing the sponsor links before or after a group of search results. In addition to the visual indicators described for re-ranking, weights of subordinate keywords, etc., audio indications could be used. Additionally, voice input can be used to remove or promote subordinate keywords, or for any other user input.

As will be understood by those of skill in the art, the present invention could be embodied in other specific forms without departing from the essential characteristics thereof. For example, in addition to subordinate keywords, data based on prior users' experiences and click streams could be used to re-rank the results in real time. This could provide two levels of ranking, (1) a first re-ranking using subordinate keywords as described above, and (2) a re-ranking of the re-ranked results using the webpages found most desirable by previous users doing similar searches.

The present invention can use a separate third party search engine, or could be integrated with a search engine. The search engine could be a general search engine that searches the internet, a specialized search engine that searches a particular web site, a database search engine, a meta-search engine that combines the results of multiple other search engines, or any other type of search engine. Accordingly the foregoing description is intended to be illustrative, but not limiting, of the scope of the invention which is set forth in the following claims.

What is claimed is:

1. A method for dynamically modifying search results comprising:
   receiving one or more keywords for use as search terms from a user;
   providing a set of search result objects on a first page of results displayed to said user;
   providing some title and display text with each of said search result objects in said set of search result objects;
   providing a plurality of advertisements on said first page of results;
   monitoring which of said objects is selected by said user;
   compiling information to infer user intent based on the content of said document the user clicks; and
   upon said user clicking to return from said document to said set of search result objects including said document, immediately automatically re-ranking said set of search result objects based on user intent inferred from said analyzing of the content of said document said user clicks on, so that a user clicking on a single document from said set of search result objects results in a re-ranking of said set of search result objects, so that upon said user returning from said document to said set of search result objects including said document, without the user resubmitting the search, the re-ranked results will be visible;
   using terms from the title and display text corresponding to a selected object in an algorithm for generating said re-ranking of said set of search result objects on at least said first page;
   wherein said re-ranking includes moving at least one object from a subsequent page, not originally visible to said user on said first page, onto said first page;
   wherein said at least one object moved onto said first page is displayed in a manner to indicate to the user that it has been inserted between other objects on said first page, with said display providing an indication that the object is from a subsequent page and was not originally displayed on said first page;
   immediately automatically selecting and displaying advertising based on user intent inferred from said analyzing of the content of said document said user clicks on, and re-ranking said plurality of advertisements on said first page by adding at least one advertisement not previously shown on said first page.

2. The method of claim 1 further comprising:
   monitoring which documents said user skips;
   compiling information to infer user intent based on the content of said documents said user skips; and
   upon said user clicking to return from said selected document to said set of search result objects including said selected document and said skipped documents, immediately automatically re-ranking said set of search result objects based on user intent inferred from said analyzing of the content of said skipped documents said, so that a user clicking on a single document from said set of search result objects results in a re-ranking of said set of search result objects, so that upon said user returning from said document to said set of search result objects including said document, without the user resubmitting the search, the re-ranked results will be visible;
   immediately automatically selecting and displaying advertising based on user intent inferred from said analyzing of the content of said skipped document.

3. The method of claim 1 further comprising:
   selecting subordinate keywords from at least one of links clicked on by the user, other links associated with a document including links pointing to the document, descriptive text associated with each document in the search results, meta-tags connected to viewed documents, prominent words and phrases in viewed documents and a thesaurus; and
   improving the ranking of search results objects containing said subordinate keywords.

4. The method of claim 1 further comprising:
   using terms from the title and display text corresponding to objects skipped by a user as negative subordinate keywords; and
   reducing the ranking of search results objects containing said negative subordinate keywords.

5. The method of claim 3 further comprising:
   assigning weights to said subordinate keywords, such that search result objects having higher weighted subordinate keywords are given increased preference in the ranking.

6. The method of claim 3 further comprising:
   providing a user interface allowing a user to manually promote selected subordinate keywords such that they have a higher weighting or are used as primary keywords to generate new search results.

7. The method of claim 3 further comprising:
   providing a user interface allowing a user to delete selected subordinate keywords.

8. The method of claim 1 further comprising:
   doing said re-ranking based on information from searches including said keywords in a same browser session;
   wherein said providing a first set of search result objects is performed by a separate search engine software program from a user behavior program that performs said monitoring and generating steps.

9. The method of claim 1 further comprising monitoring user behavior by at least one of:
   subsequent clicks on links within documents;
   dwell times;
   time spent looking at documents from specific domains;
   resources accessed;
   transactions conducted;
   purchases made;
   orders placed;

sessions created;
documents downloaded;
cursors moved;
pages or text scrolled; and
images or other information highlighted.

10. The method of claim 1 further comprising:
rating the usefulness of at least one of said search result objects in response to a user rating input; and
applying the user rating to said algorithm for generating said re-ranking.

11. The method of claim 1 further comprising:
providing a first display indication of search result objects that have been previously selected by said user; and
providing a second display indication of search result objects that have been skipped by said user.

12. The method of claim 1 further comprising:
providing a display indication of the ranking movement of said search result objects in said re-ranking of said first set of search result objects, said ranking movement indicating an amount of a change in ranking of said search result objects.

13. A system for dynamically modifying search results comprising:
a user interface on a first computer configured to receive one or more keywords for use as search terms from a user;
a search engine on a server in communication with said first computer over a network, said search engine being configured to provide a set of search result objects on a first page of results displayed in response to said keywords and to provide some title and display text with each of said search result objects in said set of search result objects and to provide a plurality of advertisements on said first page of results;
a monitoring program in communication with said network, said monitoring program being configured to monitor user behavior in interacting with said search result objects;
a re-ranking program configured to
monitor which document said user clicks on in interacting with said first set of search result objects;
monitor which documents said user skips;
compile information to infer user intent based on the content of said document the user clicks on and said documents said user skips;
upon said user clicking to return from said document to said set of search result objects including said document, immediately automatically re-rank said set of search result objects based on user intent inferred from said analyzing of the content of said document said user clicks on and said documents said user skips, so that a user clicking on a single document from said set of search result objects results in a re-ranking of said set of search result objects, so that upon said user returning from said document to said set of search result objects including said document, without the user resubmitting the search, the re-ranked results will be visible; and
use terms from the title and display text corresponding to a selected object in an algorithm for generating said re-ranking of said set of search result objects on at least said first page;
wherein said re-ranking includes moving at least one object from a subsequent page, not originally visible to said user on said first page, onto said first page;
wherein said at least one object moved onto said first page is displayed in a manner to indicate to the user that it has been inserted between other objects on said first page, with said display providing an indication that the object is from a subsequent page and was not originally displayed on said first page;
an advertising program configured to select and display advertising based on user intent inferred from said analyzing of the content of said document said user clicks on and said documents said user skips and immediately and automatically re-ranking said plurality of advertisements on said first page by adding at least one advertisement not previously shown on said first page.

14. The system of claim 13 wherein said search engine is on a first server, and said monitoring and re-ranking programs are on a second server.

15. A device having a processor which will perform the steps of:
receiving one or more keywords for use as search terms from a user;
providing a set of search result objects on a first page of results displayed;
providing some title and display text with each of said search result objects in said set of search result objects;
providing a plurality of advertisements on said first page of results;
monitoring which of said objects is selected by said user;
monitoring which documents said user skips;
compiling information to infer user intent based on the content of said document the user clicks on and said documents said user skips;
upon said user clicking to return from said document to said set of search result objects including said document, immediately automatically re-ranking said first set of search result objects based on user intent inferred from said analyzing of the content of said document said user clicks on and said documents said user skips, so that a user clicking on a single document from said set of search result objects results in a re-ranking of said set of search result objects, so that upon said user returning from said document to said set of search result objects including said document, without the user resubmitting the search, the re-ranked results will be visible;
using terms from the title and display text corresponding to a selected object in an algorithm for generating said re-ranking of said set of search result objects on at least said first page;
wherein said re-ranking includes moving at least one object from a subsequent page, not originally visible to said user on said first page, onto said first page;
wherein said at least one object moved onto said first page is displayed in a manner to indicate to the user that it has been inserted between other objects on said first page, with said display providing an indication that the object is from a subsequent page and was not originally displayed on said first page;
selecting and displaying advertising based on said user behavior by immediately and automatically re-ranking said plurality of advertisements on said first page by adding at least one advertisement not previously shown on said first page.

16. A method for ranking a set of search results having an initial ranking, comprising:
determining one or more selected objects in said set of search results which corresponds to user interest based on user behavior;
providing some title and display text with each of said search result objects on a first page of results displayed in said set of search result objects;

monitoring which of said objects is selected by said user;
monitoring which documents said user skips;
compiling information to infer user intent based on the content of said document the user clicks on and said documents said user skips;
upon said user clicking to return from said document to said set of search result objects including said document, immediately automatically re-ranking said set of search result objects based on user intent inferred from said analyzing of the content of said document said user clicks on and said documents said user skips, so that a user clicking on a single document from said first set of search result objects results in a re-ranking of said set of search result objects, so that upon said user returning from said document to said set of search result objects including said document, without the user resubmitting the search, the re-ranked results will be visible;
using terms from the title and display text corresponding to a selected object as positive subordinate keywords for generating said re-ranking of said set of search result objects;
increasing the ranking of search results objects containing positive subordinate keywords;
using terms from the title and display text corresponding to objects skipped by a user as negative subordinate keywords;
reducing the ranking of search results objects containing said negative subordinate keywords;
wherein said re-ranking includes moving at least one object from a subsequent page, not originally visible to said user on said first page, onto said first page;
wherein said at least one object moved onto said first page is displayed in a manner to indicate to the user that it has been inserted between other objects on said first page, with said display providing an indication that the object is from a subsequent page and was not originally displayed on said first page; and
selecting and displaying advertising based on said at least one subordinate keyword by immediately and automatically re-ranking said plurality of advertisements on said first page by adding at least one advertisement not previously shown on said first page.

17. The method of claim 1 wherein said selecting and displaying advertising based on said user behavior further comprises:
dynamically altering sponsored links to reflect the interests of the user.

18. The method of claim 1 wherein said selecting and displaying advertising based on said user behavior further comprises:
providing a plurality of advertisements; and
reordering said advertisements based on said user behavior.

19. The method of claim 1 wherein said performing said selecting and displaying advertising based on said subordinate keywords further comprises:
allocating particular keywords to particular sponsors.

20. The method of claim 10 wherein said rating the usefulness of at least one of said search result objects in response to a user rating input further comprises:
providing a search object rating for an indicated search object;
adjusting the weights of subordinate keywords associated with said indicated search object in accordance with said search object rating.

21. The method of claim 1 further comprising:
wherein said second set of search results are generated by using a separate search engine to perform a second search in the background, comparing the results of said second search to said set of search result objects, and re-ranking said set of search results based on said results of said second search.

22. The method of claim 4 further comprising:
assigning weights to said negative subordinate keywords, such that search result objects having higher weighted subordinate keywords are given decreased preference in the ranking.

23. The method of claim 4 further comprising:
providing a user interface allowing a user to manually demote selected negative subordinate keywords such that they have a higher weighting.

24. The method of claim 4 further comprising:
providing a user interface allowing a user to delete selected negative subordinate keywords.

\* \* \* \* \*